(12) United States Patent

Gonzalez

(10) Patent No.: US 12,661,935 B2

(45) Date of Patent: Jun. 23, 2026

(54) MUD AND SNOW TIRE

(71) Applicant: TIRE GROUP INTERNATIONAL, LLC, Miami, FL (US)

(72) Inventor: Antonio Rafael Gonzalez, Miami, FL (US)

(73) Assignee: TIRE GROUP INTERNATIONAL, LLC, Miami, FL (US)

( * ) Notice: Subject to any disclaimer, the term of this patent is extended or adjusted under 35 U.S.C. 154(b) by 0 days.

(21) Appl. No.: 17/365,941

(22) Filed: Jul. 1, 2021

(65) Prior Publication Data

US 2022/0001703 A1 Jan. 6, 2022

Related U.S. Application Data

(60) Provisional application No. 63/047,754, filed on Jul. 2, 2020.

(51) Int. Cl.
| | |
|---|---|
| *B60C 13/02* | (2006.01) |
| *B60C 11/03* | (2006.01) |
| *B60C 15/024* | (2006.01) |
| *B60C 15/04* | (2006.01) |

(52) U.S. Cl.
CPC ............ *B60C 15/024* (2013.01); *B60C 11/03* (2013.01); *B60C 13/02* (2013.01); *B60C 15/04* (2013.01); *B60C 2200/14* (2013.01)

(58) Field of Classification Search
CPC ..... B60C 13/02; B60C 2200/14; B60C 13/00; B60C 13/001; B60C 13/002; B60C 13/023
USPC ................................................. D12/605, 579
See application file for complete search history.

(56) References Cited

U.S. PATENT DOCUMENTS

| | | | |
|---|---|---|---|
| D211,148 S | 5/1968 | Ueno | |
| 2013/0075006 A1 | 3/2013 | Kojima et al. | |
| 2016/0297257 A1* | 10/2016 | Douglas ................. | B60C 17/00 |
| 2022/0111681 A1* | 4/2022 | Sakamoto ............... | B60C 11/01 |

FOREIGN PATENT DOCUMENTS

| | | | | |
|---|---|---|---|---|
| DE | 4111345 A1 | 11/1991 | | |
| DE | 102012217865 A1 | 3/2013 | | |
| JP | 08-282218 A | 10/1996 | | |
| JP | H08282218 A | * 10/1996 | ........... | B60C 13/002 |

OTHER PUBLICATIONS

Non-Final Office Action issued in related U.S. Appl. No. 17/365,927 on Jul. 22, 2022.
Non-Final Office Action issued in related U.S. Appl. No. 17/365,927 on issue Date; Mar. 7, 2024.
Final Office Action issued in related U.S. Appl. No. 17/365,927 on Dec. 5, 2024.
Non Final Office Action issued in related U.S. Appl. No. 17/365,927 on Sep. 27, 2023.
Non-Final Office Action issued in related U.S. Appl. No. 17/365,927 on Jun. 9, 2025.

* cited by examiner

*Primary Examiner* — Justin R Fischer
*Assistant Examiner* — Philip N Schwartz
(74) *Attorney, Agent, or Firm* — Brian J. Colandreo; Jeffrey T. Placker; Holland & Knight LLP

(57) ABSTRACT

A pneumatic tire assembly includes: a tread portion including one or more traction features; a first sidewall portion coupled to the tread portion; and a first bead portion coupled to the first sidewall portion; wherein the first sidewall portion includes multiangle first tread traction features positioned proximate the tread portion.

21 Claims, 5 Drawing Sheets

(Left Side View)

(Right Side View)

(Left Side View)

(Right Side View)

MUD AND SNOW TIRE

RELATED APPLICATION(S)

This application claims the benefit of U.S. Provisional Application No. 63/047,754, filed on 2 Jul. 2020, the entire contents of which are incorporated herein by reference.

TECHNICAL FIELD

This disclosure relates to tires and, more particularly, to mud & snow tires.

BACKGROUND

The configuration of a tire is directly dependent upon its anticipated use. For example, tires for use on a dry race track may not include any tread pattern, as there is no need to channel away water to the sides of the tire. Further, summer performance tires are typically designed for use in a dry environment, so they may include a minimal tread pattern to meet DOT requirements for on-road use. All season tire may include a more substantial tread pattern so that rain and snow may be handled.

However, mud & snow tires tend to have a much more aggressive tread pattern so that they provide traction in loose surface conditions. Typically, a mud & snow tread pattern includes deep lug grooves with many edge components to provide the grip/bite necessary to maintain traction while preventing mud/snow from clogging the tread pattern.

Although current tread technology focuses on improving driving performance via grooves in a tread pattern, the sidewalls of these tire are often ignored/underutilized.

SUMMARY OF DISCLOSURE

Traction Features by Tread

In one implementation, a pneumatic tire assembly includes: a tread portion including one or more traction features; a first sidewall portion coupled to the tread portion; and a first bead portion coupled to the first sidewall portion; wherein the first sidewall portion includes multiangle first tread traction features positioned proximate the tread portion.

One or more of the following features may be included. The multiangle first tread traction features positioned proximate the tread portion may stand proud of the first sidewall portion. The first sidewall portion may include first bead traction features positioned proximate the first bead portion. The first bead traction features positioned proximate the first bead portion may include: multiangle first bead traction features positioned proximate the first bead portion. The first bead traction features positioned proximate the first bead portion may stand proud of the first sidewall portion. A second sidewall portion may be coupled to the tread portion. A second bead portion may be coupled to the second sidewall portion. The second sidewall portion may include multiangle second tread traction features positioned proximate the tread portion. The multiangle second tread traction features positioned proximate the tread portion may stand proud of the second sidewall portion. The second sidewall portion may include second bead traction features positioned proximate the second bead portion. The second bead traction features positioned proximate the second bead portion may include: multiangle second bead traction features positioned proximate the second bead portion. The second bead traction features positioned proximate the second bead portion may stand proud of the second sidewall portion.

In another implementation, a pneumatic tire assembly includes: a tread portion including one or more traction features; a first sidewall portion coupled to the tread portion; a first bead portion coupled to the first sidewall portion, wherein the first sidewall portion includes multiangle first tread traction features positioned proximate the tread portion; a second sidewall portion coupled to the tread portion; and a second bead portion coupled to the second sidewall portion, wherein the second sidewall portion includes multiangle second tread traction features positioned proximate the tread portion.

One or more of the following features may be included. The first tread traction features positioned proximate the first bead portion may stand proud of the first sidewall portion. The second tread traction features positioned proximate the second bead portion may stand proud of the second sidewall portion.

In another implementation, a pneumatic tire assembly includes: a tread portion including one or more traction features; a first sidewall portion coupled to the tread portion; a first bead portion coupled to the first sidewall portion, wherein the first sidewall portion includes: first bead traction features positioned proximate the first bead portion, and multiangle first tread traction features positioned proximate the tread portion; a second sidewall portion coupled to the tread portion; and a second bead portion coupled to the second sidewall portion, wherein the second sidewall portion includes: second bead traction features positioned proximate the second bead portion, and multiangle second tread traction features positioned proximate the tread portion.

One or more of the following features may be included. The first bead traction features positioned proximate the first bead portion may include: multiangle first bead traction features positioned proximate the first bead portion. The first bead traction features positioned proximate the first bead portion may stand proud of the first sidewall portion. The second bead traction features positioned proximate the second bead portion may include: multiangle second bead traction features positioned proximate the second bead portion. The second bead traction features positioned proximate the second bead portion may stand proud of the second sidewall portion. The multiangle first tread traction features positioned proximate the tread portion may stand proud of the first sidewall portion. The multiangle second tread traction features positioned proximate the tread portion may stand proud of the second sidewall portion.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1L:
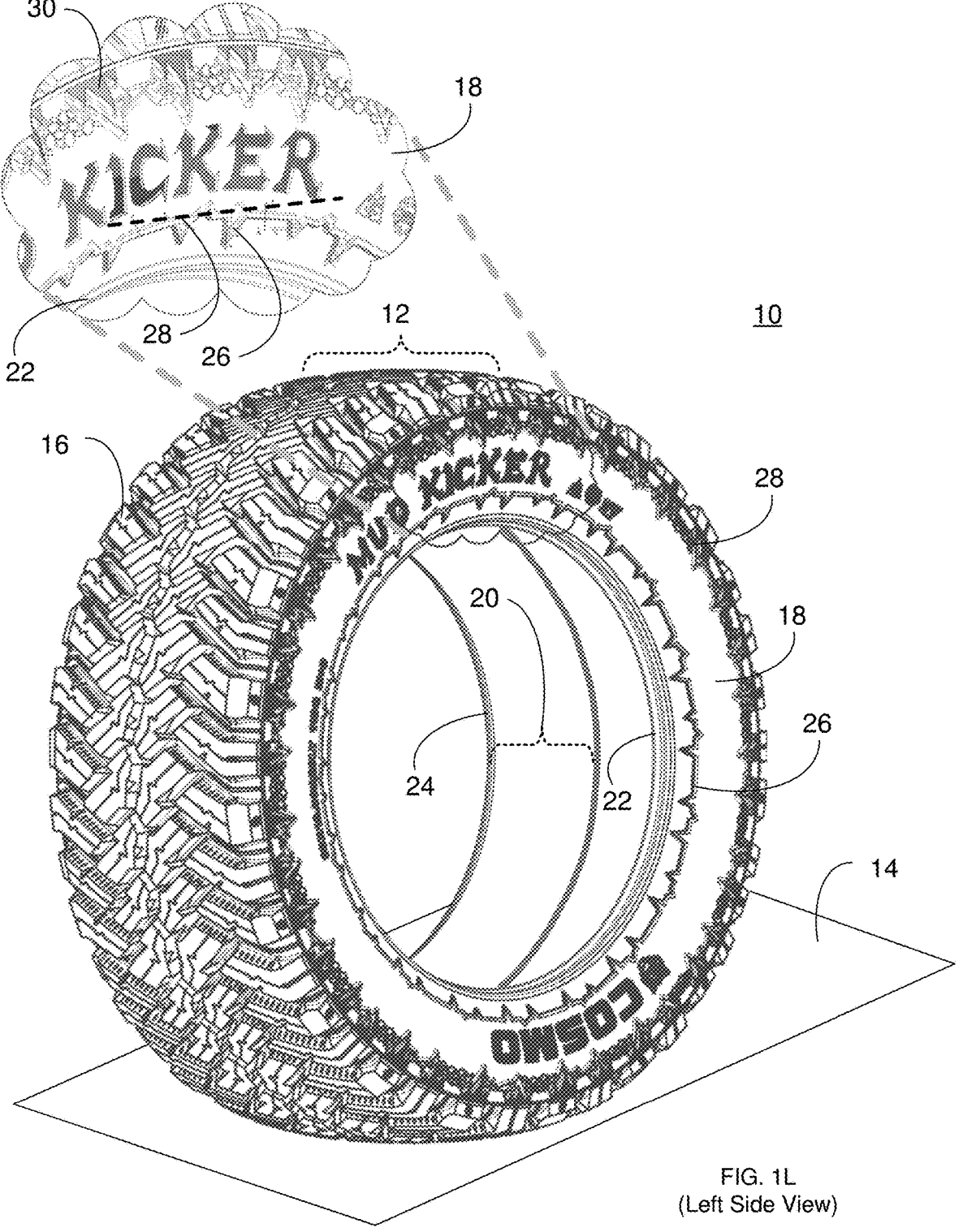
FIG. 1L is an isometric right side view of a pneumatic tire assembly according to an embodiment of the present disclosure.

Referring to FIGS. 1L-1R, there is shown pneumatic tire assembly 10. Examples of pneumatic tire assembly 10 may include any pneumatic vehicle tire (generally) and any pneumatic vehicle tire configured for use in highly demanding conditions (e.g., in mud, snow, loose dirt, gravel, slush, etc.). Pneumatic tire assembly 10 may be constructed in various fashions, examples of which may include but are not limited to radial ply tires and bias ply tires.

As is known in the art, radial ply tires utilize body ply cords extending from the beads and across the tread so that the cords are laid at approximately right angles to the centerline of the tread and parallel to each other. Stabilizer belts may be positioned directly beneath the tread, wherein these belts may be cord or steel. As is known in the art, bias ply tires utilizes body ply cords that extend diagonally from bead to bead (usually at angles in the range of 30 to 40 degrees) with successive plies laid at opposing angles that form a crisscross pattern to which the tread is applied, a design that allows the entire tire body to flex and provide a smooth ride on rough surfaces.

Pneumatic tire assembly 10 may include tread portion 12. As is known in the art, tread portion 12 is the part of the tire (e.g., pneumatic tire assembly 10) that makes contact with the road surface (e.g., road surface 14), wherein the portion of the tire (e.g., pneumatic tire assembly 10) that makes contact with the road surface (e.g., road surface 14) may be referred to as the contact patch. Tread portion 12 may include various traction features 16, examples of which may include but are not limited to circumferential grooves, lateral sipes, slots (for road tires) and/or a system of lugs and voids (for soft terrain/mud/snow tires). Grooves, sipes and slots may allow the tire (e.g., pneumatic tire assembly 10) to evacuate water from the contact patch and mitigate hydroplaning, wherein lugs and voids may provide the grip/bite necessary to maintain traction on loose surfaces (e.g., sand/ mud/snow).

Different tread designs may address a variety of driving conditions. As the ratio of tire tread area to groove area increases, so does the lateral grip on the road surface (e.g., road surface 14). High-performance tires may have smaller void areas to provide more rubber in contact with the road surface (e.g., road surface 14) for higher traction while still providing water evacuation. Mud and snow tires may employ larger and deeper slots and/or lugs to engage mud and snow and provide the necessary grip/bite to maintain traction.

Pneumatic tire assembly 10 may include a first sidewall portion (e.g., first sidewall portion 18) and a second sidewall portion (e.g., second sidewall portion 20), both of which are coupled to tread portion 12. A first bead portion (e.g., first bead portion 22) may be coupled to first sidewall portion 18 and a second bead portion (e.g., second bead portion 24) may be coupled to second sidewall portion 20. As is known in the art, a sidewall (e.g., first sidewall portion 18 and/or second sidewall portion 20) may be the part of the tire (e.g., pneumatic tire assembly 10) that bridges between the tread (e.g., tread portion 12) and the bead (e.g., first bead portion 22 and/or second bead portion 24). The sidewall (e.g., first sidewall portion 18 and/or second sidewall portion 20) may be constructed of rubber reinforced with fabric or steel cords that provide tensile strength and flexibility. The sidewall (e.g., first sidewall portion 18 and/or second sidewall portion 20) may transmit the torque applied by the drive axle to the tread (e.g., tread portion 12) to create traction while supporting (e.g., pneumatically) the weight of the vehicle. Sidewalls (e.g., first sidewall portion 18 and/or second sidewall portion 20) may be molded with manufacturer-specific detail, government mandated warning labels and other consumer information, as well as other decorative ornamentation (e.g., whitewalls or tire lettering).

As is known in the art, a tire bead (e.g., first bead portion 22 and/or second tire bead portion 24) may be the part of the tire (e.g., pneumatic tire assembly 10) that contacts the rim/wheel (not shown) onto which the tire (e.g., pneumatic tire assembly 10) is mounted. The bead (e.g., first bead portion 22 and/or second tire bead portion 24) may be reinforced with steel wire and compounded of high strength, low flexibility rubber. The bead (e.g., first bead portion 22 and/or second tire bead portion 24) may seat tightly against the lip of the rim/wheel (not shown) to a) ensure that the tire (e.g., pneumatic tire assembly 10) maintains air pressure without leakage and b) prevents any torque-induced circumferential slippage of the tire (e.g., pneumatic tire assembly 10) with respect to the rim/wheel (not shown) onto which the tire (e.g., pneumatic tire assembly 10) is mounted.

Figure 2L:
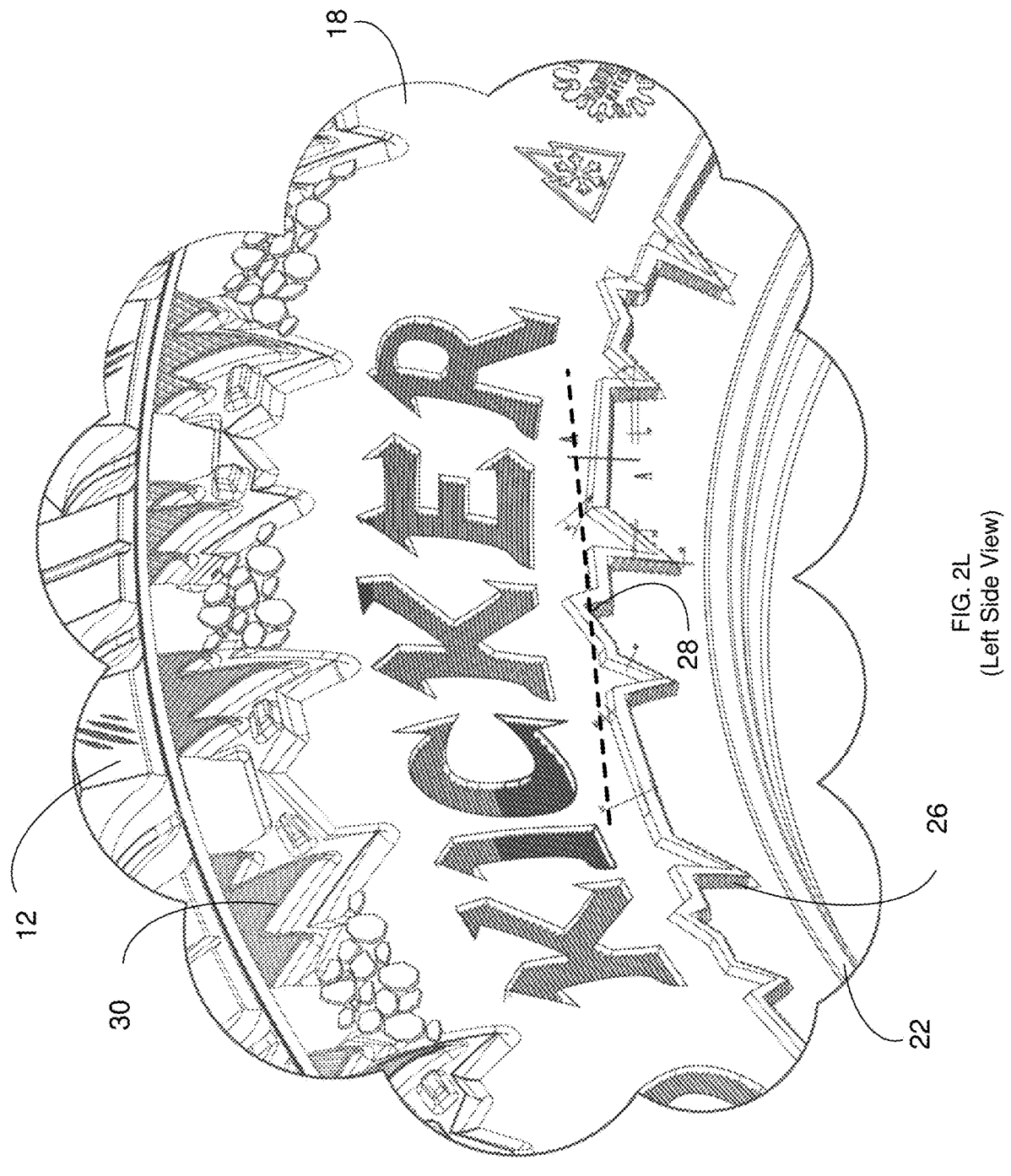
FIG. 2L is a detail right side view of a pneumatic tire assembly according to an embodiment of the present disclosure.

Referring specifically to FIGS. 1L & 2L, the first sidewall portion (e.g., first sidewall portion 18) may include first bead traction features (e.g., first bead traction features 26) positioned proximate the first bead portion (e.g., first bead portion 22), wherein these first bead traction features (e.g., first bead traction features 26) positioned proximate the first bead portion (e.g., first bead portion 22) may stand proud of the first sidewall portion (e.g., first sidewall portion 18). Specifically, first bead traction features 26 may be raised above the surface of first sidewall portion 18 by one to many millimeters in order to provide enhanced grip/bite when encountering loose driving conditions (such as when travelling through mud/snow/gravel/sand). Accordingly, it is foreseeable that first bead traction features 26 may stand proud of the surface of first sidewall portion 18 by as little as one millimeter and to substantially more (e.g., >12 millimeters when pneumatic tire assembly 10 is designed for extremely adverse conditions).

The first bead traction features (e.g., first bead traction features 26) positioned proximate the first bead portion (e.g., first bead portion 22) may include multiangle first bead traction features (e.g., first bead traction features 26) positioned proximate the first bead portion (e.g., first bead portion 22). In this particular example, first bead traction features 26 is shown to be in the form of a "heartbeat" pattern, wherein the individual portions of first bead traction features 26 may vary from an angle of <10 degrees (with respect to tangent line 28) to 90 degrees (with respect to tangent line 28), thus enabling the various surfaces of first bead traction features 26 to self "clean" and provide better grip/bite with respect to the material through which the pneumatic tire assembly 10 is travelling.

The first sidewall portion (e.g., first sidewall portion 18) may include multiangle first tread traction features (e.g., multiangle first tread traction features 30) positioned proximate the tread portion (e.g., tread portion 12), wherein these multiangle first tread traction features (e.g., multiangle first tread traction features 30) positioned proximate the tread portion (e.g., tread portion 12) may stand proud of the first sidewall portion (e.g., first sidewall portion 18). Specifically, multiangle first tread traction features 30 may be raised above the surface of first sidewall portion 18 by one to many millimeters in order to provide enhanced grip/bite when encountering loose driving conditions (such as when travelling through mud/snow/gravel/sand). Accordingly, it is foreseeable that multiangle first tread traction features 30 may stand proud of the surface of first sidewall portion 18 by as little as one millimeter and to substantially more (e.g., >12 millimeters when pneumatic tire assembly 10 is designed for extremely adverse conditions). The individual portions of multiangle first tread traction features 30 may vary from an angle of <10 degrees (with respect to tangent line 28) to 90 degrees (with respect to tangent line 28), thus enabling the various surfaces of multiangle first tread traction features 30 to self "clean" and provide better grip/bite with respect to the material through which the pneumatic tire assembly 10 is travelling.

Figure 1R:
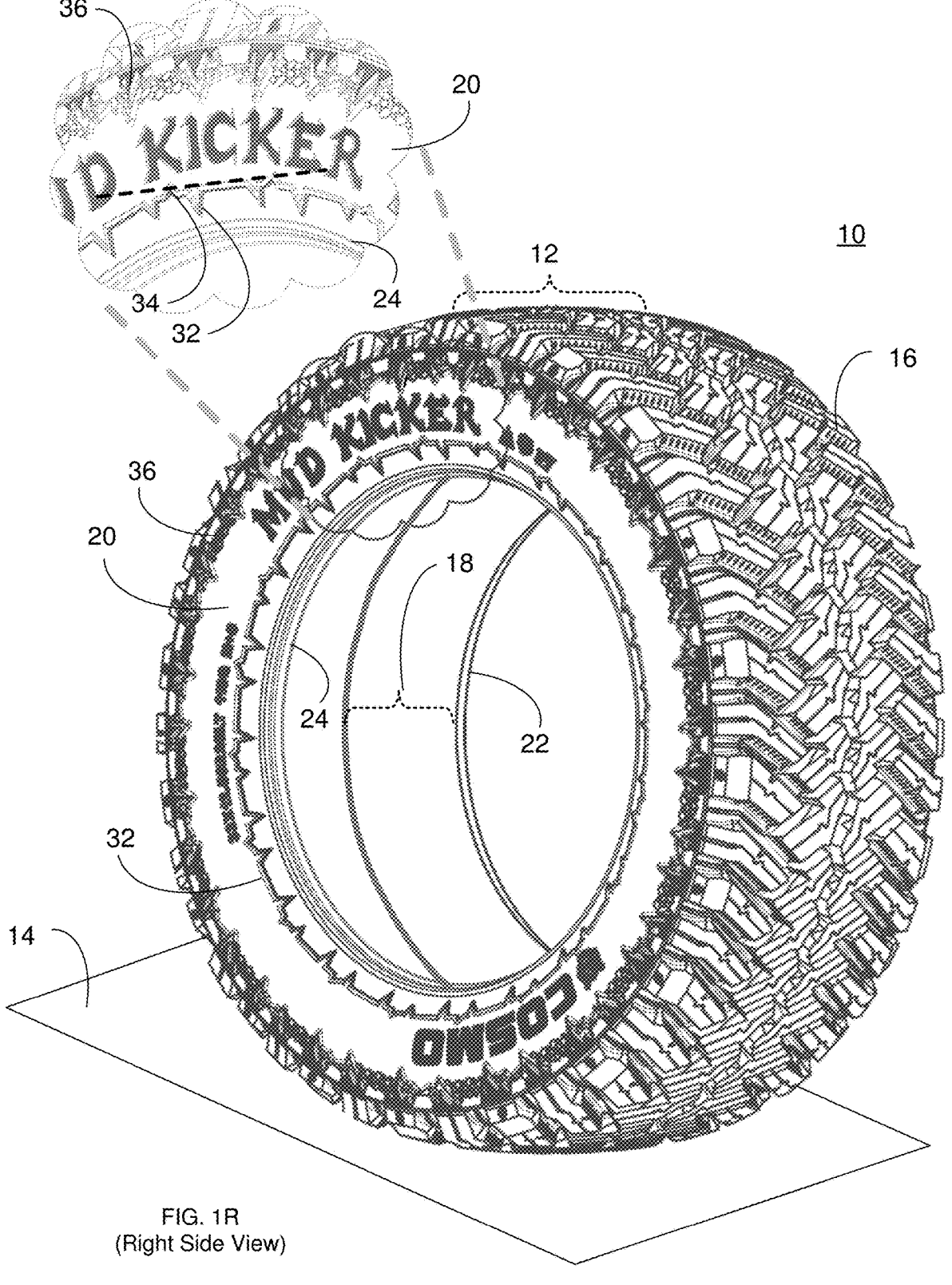
FIG. 1R is an isometric left side view of a pneumatic tire assembly according to an embodiment of the present disclosure.
Figure 2R:
FIG. 2R is a detail right side view of a pneumatic tire assembly according to an embodiment of the present disclosure.

Referring specifically to FIGS. 1R & 2R, the second sidewall portion (e.g., second sidewall portion 20) may include second bead traction features (e.g., second bead traction features 32) positioned proximate the second bead portion (e.g., second bead portion 24), wherein these second bead traction features (e.g., second bead traction features 32) positioned proximate the second bead portion (e.g., second bead portion 24) may stand proud of the second sidewall portion (e.g., second sidewall portion 20). Specifically, second bead traction features 32 may be raised above the surface of second sidewall portion 20 by one to many millimeters in order to provide enhanced grip/bite when encountering loose driving conditions (such as when travelling through mud/snow/gravel/sand). Accordingly, it is foreseeable that second bead traction features 32 may stand proud of the surface of second sidewall portion 20 by as little as one millimeter and to substantially more (e.g., >12 millimeters when pneumatic tire assembly 10 is designed for extremely adverse conditions).

The second bead traction features (e.g., second bead traction features 32) positioned proximate the second bead portion (e.g., second bead portion 24) may include multiangle second bead traction features (e.g., second bead traction features 32) positioned proximate the second bead portion (e.g., second bead portion 24). In this particular example, second bead traction features 32 is shown to be in the form of a "heartbeat" pattern, wherein the individual portions of second bead traction features 32 may vary from an angle of <10 degrees (with respect to tangent line 34) to 90 degrees (with respect to tangent line 34), thus enabling the various surfaces of second bead traction features 32 to self "clean" and provide better grip/bite with respect to the material through which the pneumatic tire assembly 10 is travelling.

The second sidewall portion (e.g., second sidewall portion 20) may include multiangle second tread traction features (e.g., multiangle second tread traction features 36) positioned proximate the tread portion (e.g., tread portion 12), wherein these multiangle second tread traction features (e.g., multiangle second tread traction features 36) positioned proximate the tread portion (e.g., tread portion 12) may stand proud of the second sidewall portion (e.g., second sidewall portion 20). Specifically, multiangle second tread traction features 36 may be raised above the surface of second sidewall portion 20 by one to many millimeters in order to provide enhanced grip/bite when encountering loose driving conditions (such as when travelling through mud/snow/gravel/sand). Accordingly, it is foreseeable that multiangle second tread traction features 36 may stand proud of the surface of second sidewall portion 20 by as little as one millimeter and to substantially more (e.g., >12 millimeters when pneumatic tire assembly 10 is designed for extremely adverse conditions). The individual portions of multiangle second tread traction features 36 may vary from an angle of <10 degrees (with respect to tangent line 34) to 90 degrees (with respect to tangent line 34), thus enabling the various surfaces of multiangle second tread traction features 36 to self "clean" and provide better grip/bite with respect to the material through which the pneumatic tire assembly 10 is travelling.

Figure 3:
FIG. 3 is a detail view of a pneumatic tire assembly according to an embodiment of the present disclosure.

While first bead traction features (e.g., first bead traction features 26) and second bead traction features (e.g., second bead traction features 32) are shown to be in the form of a "heartbeat" pattern, this is for illustrative purposes only and is not intended to be a limitation of this disclosure, as other configurations are possible and are considered to be within the of this disclosure. For example, first bead traction features 26 and/or second bead traction features 32 may be implemented in other configurations, such as the "circular" pattern shown in FIG. 3.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A pneumatic tire assembly comprising:
   a tread portion including one or more traction features;
   a first sidewall portion coupled to the tread portion; and
   a first bead portion coupled to the first sidewall portion;
   wherein the first sidewall portion includes multiangle first tread traction features positioned proximate the tread portion including a discontinuous nominally circular pattern around the tire, generally concentric with the first bead portion, wherein individual portions of the multiangle first tread traction features are angled with respect to a tangent line of the discontinuous nominally circular pattern and extend down the first sidewall portion in a radial direction of the discontinuous nominally circular pattern toward the first bead portion enabling self-cleaning of the first tread traction features and configured to provide improved grip with respect to material through which the pneumatic tire assembly travels, wherein the multiangle first tread traction features include a layered structure including a first tier multiangle tread traction feature protruding from the first sidewall portion outwardly in a direction generally perpendicular to a plane of the first sidewall portion and a second tier multiangle tread traction feature protruding from the first tier multiangle traction feature outwardly in a direction generally perpendicular to a plane of the first tier multiangle tread traction feature, the second tier multiangle tread traction feature including a three-peaked structure extending in the radial direction toward the first bead portion with a central peaked feature having a greatest radial extent of the three-peaked structure, and including a step between the first tier multiangle tread traction feature and the second tier multiangle tread traction feature.

2. The pneumatic tire assembly of claim 1 wherein the multiangle first tread traction features positioned proximate the tread portion stand proud of the first sidewall portion.

3. The pneumatic tire assembly of claim 1 wherein the first sidewall portion includes first bead traction features positioned proximate the first bead portion.

4. The pneumatic tire assembly of claim 3 wherein the first bead traction features positioned proximate the first bead portion include:

first bead traction features positioned proximate the first bead portion.

5. The pneumatic tire assembly of claim 3 wherein the first bead traction features positioned proximate the first bead portion stand proud of the first sidewall portion.

6. The pneumatic tire assembly of claim 1 further comprising:

a second sidewall portion coupled to the tread portion; and a second bead portion coupled to the second sidewall portion.

7. The pneumatic tire assembly of claim 6 wherein the second sidewall portion includes multiangle second tread traction features positioned proximate the tread portion.

8. The pneumatic tire assembly of claim 7 wherein the multiangle second tread traction features positioned proximate the tread portion stand proud of the second sidewall portion.

9. The pneumatic tire assembly of claim 7 wherein the second sidewall portion includes second bead traction features positioned proximate the second bead portion.

10. The pneumatic tire assembly of claim 9 wherein the second bead traction features positioned proximate the second bead portion include:

multiangle second bead traction features positioned proximate the second bead portion.

11. The pneumatic tire assembly of claim 9 wherein the second bead traction features positioned proximate the second bead portion stand proud of the second sidewall portion.

12. A pneumatic tire assembly comprising:

a tread portion including one or more traction features;

a first sidewall portion coupled to the tread portion;

a first bead portion coupled to the first sidewall portion, wherein the first sidewall portion includes multiangle first tread traction features positioned proximate the tread portion, the first tread traction features including a discontinuous nominally circular pattern around the tire generally concentric with the first bead portion, wherein individual portions of the multiangle first tread traction features are angled with respect to a tangent line of the discontinuous nominally circular pattern and extend down the first sidewall portion in a radial direction of the discontinuous nominally circular pattern toward the first bead portion enabling self-cleaning of the first tread traction features and configured to provide improved grip with respect to material through which the pneumatic tire assembly travels, wherein the multiangle first tread traction features include a layered structure including a first tier multiangle tread traction feature protruding from the first sidewall portion outwardly in a direction generally perpendicular to a plane of the first sidewall portion and a plurality of multi-toothed traction features protruding from the first tier multiangle tread traction feature outwardly in a direction generally perpendicular to a plane of the first tier multiangle tread traction feature, the multi-toothed traction features including a three-peaked structure extending in the radial direction toward the first bead portion with a central peaked feature having a greatest radial extent of the multi-toothed structures, and including a step between the first tier multiangle tread traction feature and the plurality of multi-toothed traction features, and wherein each of the plurality of multi-toothed traction features is separated from adjacent multi-toothed traction features;

a second sidewall portion coupled to the tread portion; and a second bead portion coupled to the second sidewall portion, wherein the second sidewall portion includes multiangle second tread traction features positioned proximate the tread portion, the second tread traction features including a discontinuous nominally circular pattern around the tire generally concentric with the second bead portion, wherein individual portions of the multiangle second tread traction features are angled with respect to a tangent line of the discontinuous nominally circular pattern and extend down the second sidewall portion in a radial direction of the nominally circular pattern toward the second bead portion enabling self-cleaning of the second tread traction features and configured to improve grip with respect to material through which the pneumatic tire assembly travels, wherein the multiangle second tread traction features include a plurality of multi-toothed traction features.

13. The pneumatic tire assembly of claim 12 wherein the first tread traction features positioned proximate the first tread portion stand proud of the first sidewall portion.

14. The pneumatic tire assembly of claim 12 wherein the second tread traction features positioned proximate the second tread portion stand proud of the second sidewall portion.

15. A pneumatic tire assembly comprising:

a tread portion including one or more traction features;

a first sidewall portion coupled to the tread portion;

a first bead portion coupled to the first sidewall portion, wherein the first sidewall portion includes:

first bead traction features positioned proximate the first bead portion, and multiangle first tread traction features positioned proximate the tread portion including a discontinuous nominally circular pattern around the tire generally concentric with the first bead portion, wherein individual portions of the multiangle first tread traction features are angled with respect to a tangent line of the discontinuous nominally circular pattern and extend down the first sidewall portion in a radial direction of the discontinuous nominally circular pattern toward the first bead portion enabling self-cleaning of the first tread traction features and configured to provide improved grip with respect to material through which the pneumatic tire assembly travels, wherein the multiangle first tread traction features include a layered structure including a first tier multiangle tread traction feature protruding from the first sidewall portion outwardly in a direction generally perpendicular to a plane of the first sidewall portion and a plurality of multi-toothed traction features protruding from the first tier multiangle trad traction feature outwardly in a direction generally perpendicular to a plane of the first tier multiangle tread traction feature, the multi-toothed traction features including a three-peaked structure extending in the radial direction toward the first bead portion with a central peaked feature having a greatest radial extent of the multi-toothed traction features, and including a step between the first tier multiangle tread traction feature and the plurality of multi-toothed traction features, and wherein each of the plurality of multi-toothed traction features is separated from adjacent multi-toothed traction features;
a second sidewall portion coupled to the tread portion; and a second bead portion coupled to the second sidewall portion, wherein the second sidewall portion includes:
second bead traction features positioned proximate the second bead portion, and
multiangle second tread traction features positioned proximate the tread portion, wherein individual portions of the multiangle second tread traction features are angled with respect to a tangent line.

16. The pneumatic tire assembly of claim 15 wherein the first bead traction features positioned proximate the first bead portion include:
multiangle first bead traction features positioned proximate the first bead portion.

17. The pneumatic tire assembly of claim 15 wherein the first bead traction features positioned proximate the first bead portion stand proud of the first sidewall portion.

18. The pneumatic tire assembly of claim 15 wherein the second bead traction features positioned proximate the second bead portion include:
multiangle second bead traction features positioned proximate the second bead portion.

19. The pneumatic tire assembly of claim 15 wherein the second bead traction features positioned proximate the second bead portion stand proud of the second sidewall portion.

20. The pneumatic tire assembly of claim 15 wherein the multiangle first tread traction features positioned proximate the tread portion stand proud of the first sidewall portion.

21. The pneumatic tire assembly of claim 15 wherein the multiangle second tread traction features positioned proximate the tread portion stand proud of the second sidewall portion.

* * * * *